United States Patent [19]

Sandler et al.

[11] 4,395,671

[45] Jul. 26, 1983

[54] CONTROL SYSTEM AND METHOD FOR MOTOR STARTING

[75] Inventors: Louis M. Sandler, North Reading; Robert G. Bristol, Everett, both of Mass.

[73] Assignee: Emhart Industries, Inc., Indianapolis, Ind.

[21] Appl. No.: 336,982

[22] Filed: Jan. 4, 1982

Related U.S. Application Data

[63] Continuation of Ser. No. 50,177, Jun. 20, 1979, abandoned.

[51] Int. Cl.$^3$ .............................................. H02P 1/42
[52] U.S. Cl. .................................... 318/786; 318/778
[58] Field of Search ............... 318/778, 779, 781, 782, 318/783, 784, 785, 786, 787; 307/354, 353; 328/135, 114; 364/487; 324/77 AC

[56] References Cited

U.S. PATENT DOCUMENTS

| | | | |
|---|---|---|---|
| 3,731,152 | 5/1973 | Rockefeller, Jr. | 364/487 |
| 3,758,763 | 9/1973 | Nohara et al. | 364/487 |
| 3,764,871 | 10/1973 | Scheuer et al. | 318/758 |
| 4,047,082 | 9/1977 | Scheuer et al. | 318/782 |
| 4,073,009 | 2/1978 | Andow et al. | 328/135 |
| 4,249,117 | 2/1981 | Leukhardt et al. | 318/566 |

OTHER PUBLICATIONS

Scheuer et al., "An Adjustable-Threshold Electronic Motor Starting System", 1976 IEEE Appliance Technical Conference; Purdue Univ., West Lafayette, Ind., Apr. 29-30, 1976.

*Primary Examiner*—David Smith, Jr.
*Attorney, Agent, or Firm*—Robert F. Meyer; David W. Gomes

[57] ABSTRACT

The present invention utilizes the fact that the rate of change of the amplitude of a sinusoidal waveform is substantially constant within an interval of such waveform near its zero crossing. A circuit for measuring peak amplitudes of sinusoidal waveforms includes a voltage differentiator for differentiating between a first and second reference selected within the interval of a sinusoidal waveform wherein the rate of change of the amplitude is substantially constant; a time interval calculator for measuring a time interval between the references; a frequency determinator for determining the frequency of oscillation of the waveform; and a processing unit responsive to the voltage differentiator, the time interval calculator, and the frequency determinator for determining a peak amplitude of the waveform. In accordance with the present invention, a method of controlling the operation of an induction motor of the type having a main winding and at least one start winding utilizes the circuit for measuring peak amplitudes of sinusoidal waveforms. The motor start control system includes a current sensing device for producing a waveform proportional to the main winding current of the motor and a control circuit responsive to the waveform for deenergizing the start winding of the motor when the amplitude of the waveform is less than a threshold level wherein the threshold level is variable in accordance with the start main winding current. By continuously determining peak amplitudes of the waveform which is proportional to main winding current of the motor and storing an initial peak amplitude of the waveform, the start winding is deenergized when a peak amplitude of the waveform becomes less than a defined percentage of the stored initial peak amplitude.

12 Claims, 8 Drawing Figures

CONTROL SYSTEM AND METHOD FOR MOTOR STARTING

This application is a continuation of application Ser. No. 050,177, filed June 20, 1979, now abandoned.

The present invention relates to control systems for controlling the operation of induction motors of the type having a main winding and at least one start winding wherein it is desirable to deenergize the start winding after the motor has attained a steady running state. Furthermore, the present invention relates generally to the use of a current sensing device coupled in series with the main winding of the motor and a control circuit responsive to the main winding current for controlling the activation and deactivation of the start winding.

Generally speaking, the control system of the present invention for controlling an induction motor of the type having a main winding and at least one start winding includes a circuit for measuring peak amplitudes of sinusoidal waveforms. The circuit is responsive to a current sensing device coupled in series with the main winding of the motor which produces a waveform proportionl to the main winding current. The circuit includes a voltage differentiator for differentiating between a first and second reference preselected within an interval of the waveform wherein the rate of change of the amplitude of the waveform is substantially constant; a time interval calculator for measuring a time interval between the references; a frequency determinator for determining the frequency of oscillation of the waveform; and a processing unit responsive to the voltage differentiator, the time interval calculator, and the frequency determinator for determining a peak amplitude of the waveform. By continuously determining peak amplitudes of the waveform, and storing an initial peak amplitude of the waveform, the control circuit deenergizes the start winding when a peak amplitude of the waveform becomes less than a defined percentage of the stored peak amplitude. Importantly, the threshold level utilized to determine when the start winding of the motor should be energized and deenergized is variable in accordance with the start main winding current.

In a conventional induction motor, the main winding and the start winding are typically energized simultaneously and both operate thereafter until the motor reaches its running speed. However, it is important that the start winding be energized for only short periods of time in order to prevent permanent damage to the motor due to overheating. Accordingly, once the motor has reached its steady running state it is desirable that the start winding be deenergized. Many ways have heretofore been divised in order to control the start winding. These include centrifugal switches, manual push buttons, short interval timers, and motor starting relays.

The relay approach to controlling the start winding has typically utilized the fact that the current in the main winding is a function of the speed of the motor. When the motor is stopped or running slowly the main winding current is relatively high and when the motor reaches its normal running speed the main winding current is relatively low. Typically, when the main winding current crossed an established threshold level the relay would open thereby deenergizing the start winding. Furthermore, whenever the main winding current was above the threshold level, as it would be when the motor is stopped or running slowly, the relay contacts would close and therefore the start winding would be energized.

In I.E.E.E. Conference Paper number C76-425-4-IA dated Apr. 29, 1976 and entitled "An Adjustable-Threshold Electronic Motor Starting System" P. R. Scheuer and S. B. Sample discuss the motor starting relay system referred to hereinabove and indicate therein why such relay system is not easily adaptable to a solid state control system. However, as indicated by Scheuer and Sample in the aforementioned Conference Paper, the general current sensing method of motor starting embodied in the relay apporach has many advantages associated therewith. Accordingly, there is described in the aforementioned Conference Paper and U.S. Pat. No. 3,764,871 issued to Scheuer et al on Oct. 9, 1973, a motor starting circuit which utilizes a current sensing resistor in series with the main winding to provide an alternating waveform proportional to the main winding current. The control circuit disclosed in U.S. Pat. No. 3,764,871 responds to the voltage waveform and by comparing it to a fixed threshold level thereby provides a signal to energize the start winding when the voltage waveform exceeds the fixed threshold level and to deenergize the start winding when the voltage waveform is less than the fixed threshold level. In operation, the control circuit as disclosed by Scheuer et al converts the alternating waveform produced by the sensing resistor to a changing DC signal which is proportional to the magnitude of the main winding current. The changing DC signal is compared to a fixed threshold voltage level whereby the start winding is energized or deenergized depending upon whether the DC signal is greater than or less than the fixed threshold level.

As explained by Scheuer and Sample in the aforementioned Conference Paper, the use of a fixed threshold level has proven to be inaccurate because of the non-ideal conditions which motors and starting systems are typically exposed to. Important factors such as production tolerances, operating temperatures, and line voltage variations were found to greatly influence the magnitude of main winding current and therefore influence the signal received by the control circuit. Accordingly, where a predetermined threshold level was fixed within the control circuit, these factors resulted in variations in the accuracy of control of the motor start winding. As disclosed by Scheuer et al in U.S. Pat. No. 4,047,082 issued Sept. 6, 1977, a solution to some of the problems discussed above includes adjusting threshold level in response to line voltage variations. A control circuit which provides a variable threshold level in accordance with variations in line voltages is described and disclosed in the aforementioned Conference Paper and in U.S. Pat. No. 4,047,082. As is apparent in reviewing the Scheuer et al control system, one or more auxiliary inputs are necessary in order to accomplish a variable threshold level. One of these auxiliary inputs would compensate for variations in line voltage, another auxiliary input may compensate for variations in temperature, and another auxiliary input may compensate for variation in production tolerances. Accordingly, as the number of non-ideal conditions increases the number of auxiliary inputs necessary to compensate for these conditions also increases thereby adding to the complexity and cost of the control circuit used to control the start winding.

It is well known that the main winding current is variable in accordance with the non-ideal conditions associated with the operation of an induction motor.

Accordingly, the control system and method for motor starting of the present invention utilizes this fact in conjunction with a circuit for measuring peak amplitudes of sinusoidal waveforms to compensate for non-ideal conditions associated with motor operation without requiring additional or complex circuitry.

Therefore, one aspect of the present invention is to provide a circuit for measuring peak amplitudes of sinusoidal waveforms which utilizes the fact that the rate of change of the amplitude of such waveform is almost constant at an interval in which the instantaneous amplitude of the waveform is near zero. Another aspect of the present invention, is to provide a circuit for measuring peak amplitudes of sinusoidal waveforms which includes a voltage differentiator for differentiating between a first and second reference selected within the interval of the waveform wherein the rate of change of the amplitude of the waveform is substantially constant; a time interval calculator for measuring the time interval between the references; a frequency determinator for determining the frequency of oscillation of the waveform; and a processing unit responsive to the voltage differentiator, the time interval calculator, and the frequency determinator for determining a peak amplitude of the waveform. Yet another aspect of the present invention is to provide an improved control system for motor starting of the type which utilizes a current sensing device for producing a signal proportional to the main winding current of the motor and a control circuit which is responsive to the signal for deenergizing the start winding of the motor when the amplitude of the signal is less than a threshold level wherein the threshold level is variable in accordance with start main winding current.

There is further provided, in accordance with the present invention, a method for controlling the operation of a motor of the type having a main winding and at least one start winding which includes the steps of energizing the start and main windings, continuously determining peak amplitudes of a waveform proportional to the main winding current, storing an initial peak amplitude of the waveform, and deenergizing the start winding when a peak amplitude of the waveform is less than a defined percentage of the stored peak amplitude.

Importantly, it should be noted that the control system and method for motor starting provided by the present invention utilizes a dynamic measurement of change in the main winding current in order to control the operation of the start winding. Accordingly, the control system and method of the present invention obviate the requirement for auxiliary circuits to compensate for variations in motor parameters due to non-ideal conditions since the present motor control system and method compensate for such variations by continuously monitoring the main winding current and varying the threshold level in accordance therewith.

Furthermore, the control system and method of the present invention provide a means for monitoring other undesirable motor conditions such as excessive motor current whereby the motor may be completely deenergized and the existence of a fault condition may be indicated.

Other features and advantages of the present invention will be apparent from the following detailed description of a preferred embodiment thereof, which description should be considered in conjunction with the accompanying drawings in which:

Figure 1:
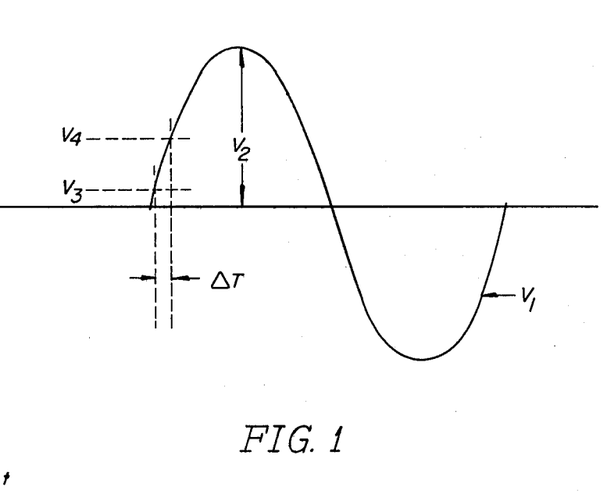
FIG. 1 is a typical sinusoidal waveform.

In order to illustrate the technique for measuring peak amplitudes of sinusoidal waveforms employed in the present invention, a typical sinusoidal waveform $V_1$ is shown in FIG. 1. It should be noted that the waveform $V_1$ may be any sinusoidal waveform represented by the expression:

$$V_1 = V_2 \sin \omega t$$

wherein the peak amplitude of the waveform $V_1$ is indicated by $V_2$ and the frequency of oscillation of the waveform is represented by omega ($\omega$). As illustrated in FIG. 1, a conventional sinusoidal waveform includes an interval typically in proximity to the zero crossing of such waveform wherein the rate of change of the amplitude of the waveform is substantially constant. The present method of measuring peak amplitudes of sinusoidal waveforms takes advantage of this feature of the waveform where the rate of change of the amplitude is substantially constant. A first known fixed voltage reference $V_3$ is selected within this interval of the waveform $V_1$. Although the value of the voltage reference $V_3$ is shown to be some value other than zero, it will be understood that $V_3$ may be located at the zero crossing of the sinusoidal waveform $V_1$. A second known fixed voltage reference $V_4$ is also selected within the interval of the waveform wherein the rate of change of the amplitude of the waveform is substantially constant. Importantly, while the voltage references $V_3$ and $V_4$ are at different locations along the waveform $V_1$, both references should be located very near to the zero crossing of the waveform since it is near this point that the change of the amplitude of said waveform is substantially constant. In accordance with the oscillatory nature of the sinusoidal waveform $V_1$ a time interval $\Delta T$ can be measured between the first reference voltage $V_3$ and the second reference voltage $V_4$ as the waveform $V_1$ oscillates.

Accordingly, utilizing the expression indicated above representing the waveform $V_1$, an approximately expression for the peak amplitude $V_2$ of waveform $V_1$ may be derived in the following manner:

$$d\frac{(V_1)}{dt} = \omega V_2 \cos \omega t$$

-continued $$d\frac{(V_1)}{dt} \cong \omega V_2 \text{ where } V_1(t) \text{ is } <<V_2$$

$$\frac{V_4 - V_3}{\Delta T} \cong \omega V_2$$

$$V_2 \cong \frac{V_4 - V_3}{\omega \Delta T}$$

As is apparent from the derived expression for the peak amplitude $V_2$ of waveform $V_1$, if the frequency of oscillation $\omega$ of the waveform is measured or known, then by measuring the time interval $\Delta T$ between first reference voltage $V_3$ and second reference voltage $V_4$ the peak amplitude $V_2$ of waveform $V_1$ is determinable in accordance with the expression:

$$V_2 \cong \frac{V_4 - V_3}{\omega \Delta T}$$

Since time intervals may be measured utilizing a clock for producing a series of equally spaced pulses and a counter, the above expression is readily adaptable for electronic circuitry for determining the peak amplitudes $V_2$ of any sinusoidal waveform $V_1$.

Furthermore, where it is desirable to compare two sinusoidal waveforms $V_1$, for example in comparing the main winding current of an induction motor during and after start up, many variables associated with the two waveforms become insignificant. For example:

$$V_2 = \frac{V_4 - V_3}{\omega \Delta T_1}$$

representing a first sinusoidal voltage waveform $V_1$ and $$V'_2 = \frac{V_4 - V_3}{\omega \Delta T'_1}$$

representing a second sinusoidal waveform $V_1'$. The expression for comparing two waveforms $V_1$ and $V_1'$ therefore becomes:

$$\frac{V'_2}{V_2} = \frac{\Delta T_1}{\Delta T'_1}$$

As shown by the latter expression, the ratio comparison between two sinusoidal waveforms $V_1$ and $V_1'$ is independent of the frequency of oscillation of each waveform and is also independent of the exact value of the first reference $V_3$ and second reference $V_4$ as long as the references $V_3$ and $V_4$ are small in comparison to the peak amplitudes $V_2$ and $V_2'$ of the two waveforms being compared.

Figure 2:
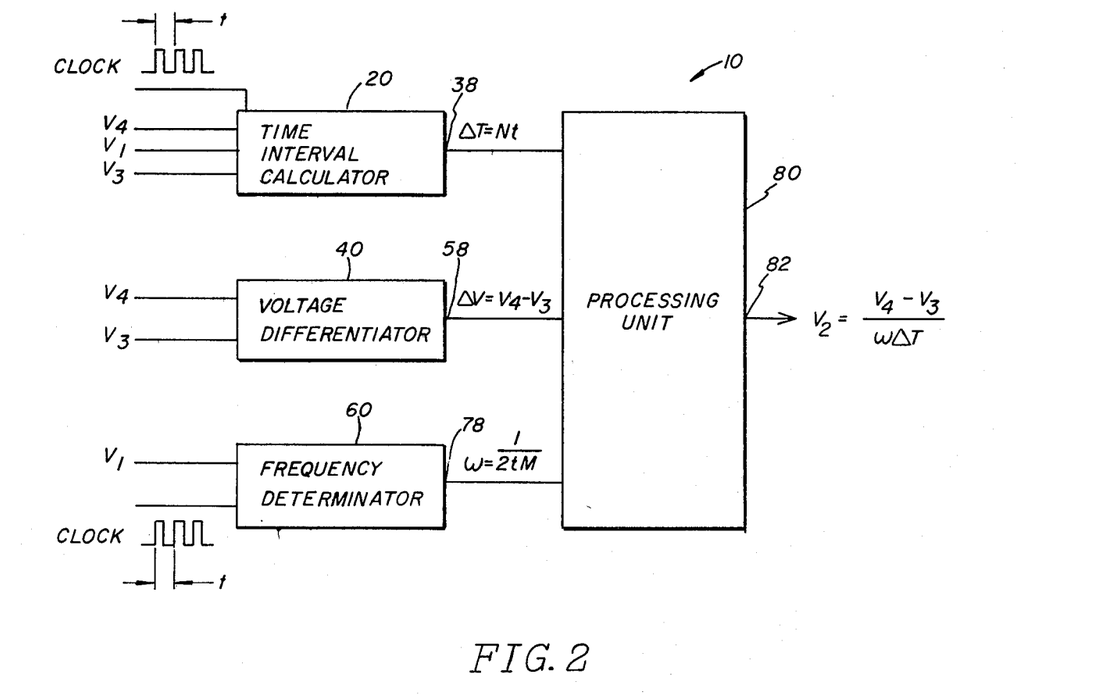
FIG. 2 is a functional block diagram of a circuit means for measuring the amplitude of a sinusoidal waveform constructed in accordance with the present invention.

Shown in FIGS. 2 is a functional block diagram of a circuit 10 for measuring the peak amplitude of a sinusoidal waveform utilizing the expressions derived hereinabove. The circuit 10 includes a time interval calculator 20 having an input $V_1$ (representing the sinusoidal waveform $V_1$), an input $V_3$ (representing the first voltage reference $V_3$), an input $V_4$ (representing the second voltage reference $V_4$), and a clock input responsive to a series of equally spaced electrical pulses having a period t. The output 38 of time interval calculator 20 provides a measurement of the time interval $\Delta T$ between the first reference $V_3$ and the second reference $V_4$. The circuit 10 further includes a voltage differentiator 40 having an input $V_4$ and an input $V_3$ for differentiating between the first reference $V_3$ and the second reference $V_4$. Accordingly, the output 58 of voltage differentiator 40 provides a signal representative of the difference between references $V_3$ and $V_4$. A frequency determinator 60 is further included within circuit 10 and includes an input $V_1$ and a clock input responsive to a series of equally spaced pulsed pulses having a period t. The output 78 of frequency determinator 60 provides a signal representative of the frequency of oscillation $\omega$ of the waveform $V_1$. As will be described in more detail hereinafter with respect to specific embodiments of time interval calculator 20, voltage differentiator 40, and frequency determinator 60, the time interval $\Delta T$ between references $V_3$ and $V_4$ is represented by the expression:

$$\Delta T = Nt$$

The difference between the references $V_3$ and $V_4$ is represented by the expression:

$$\Delta V = V_4 - V_3$$

and the frequency of oscillation $\omega$ of the waveform $V_1$ is represented by the expression:

$$\omega = 1/(2tM)$$

A processing unit 80 for determining the peak amplitude $V_2$ of the waveform $V_1$ in accordance with the expressions indicated hereinabove is responsive to each of the outputs 38, 58 and 78 of the time interval calculator 20, the voltage differentiator 40, and the frequency determinator 60 respectively. While the processing unit 80 may include any conventional processor capable of providing an output 82 represented by the expression:

$$V_2 = \frac{V_4 - V_3}{\omega \Delta T},$$

In the preferred embodiment, processing unit 80 is a large scale integrated chip (LSI) such a microprocessor. It will be understood by those skilled in the art that if a microprocessor is not used as the processing unit 80, individual circuitry for the time interval calculator 20 and the frequency determinator 60 will be necessary. However, where a microprocessor is utilized for the processing unit 80, the functions performed by the time interval calculator 20 and the frequency determinator 60 may be performed within the microprocessor itself and therefore discrete circuitry for the time interval calculator and the frequency determinator 60 will be unnecessary.

Figure 3:
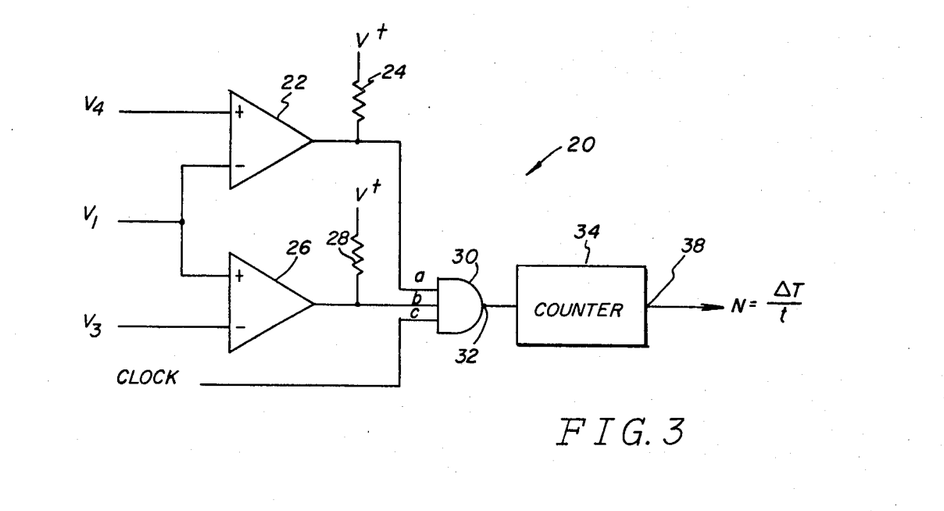
FIG. 3 is a schematic circuit diagram of an embodiment of a functional portion of the circuit means shown in FIG. 2.
Figure 4:
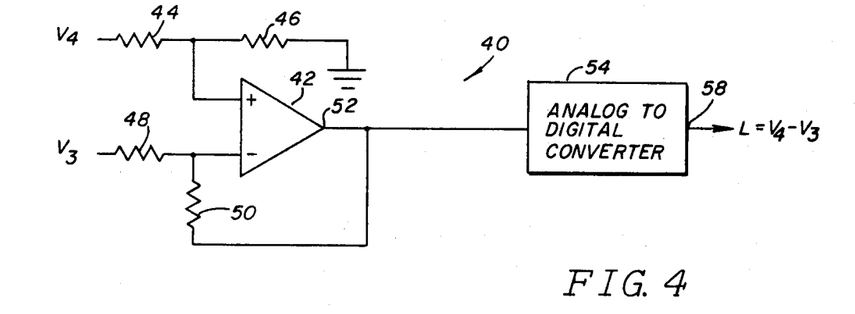
FIG. 4 is a schematic circuit diagram of an embodiment of a functional portion of the circuit means shown in FIG. 2.
Figure 5:
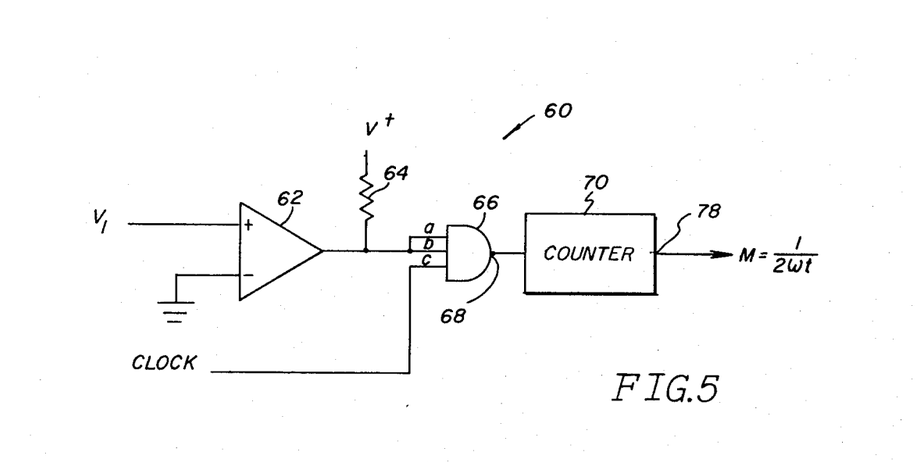
FIG. 5 is a schematic circuit diagram of an embodiment of a functional portion of the circuit means shown in FIG. 2.

Referring now to FIGS. 3, 4, and 5, schematic circuit diagrams of preferred embodiments of time interval calculator 20, voltage differentiator 40, and frequency determinator 60 are shown. It will be understood by those skilled in the art that, while the schematics illustrated in FIGS. 3, 4, and 5 are preferred embodiments of functional portions of the circuit 10 shown in FIG. 2, various other circuits may perform the functions of time interval calculating, voltage differentiating, and frequency determinating without departing from the spirit or essence of the present invention. Importantly, it should also be noted that if processing unit 80 is a microprocessor the functions associated with time interval calculator 20 and frequency determinator 60 may be accomplished by the microprocessor and therefore the need for such circuits is obviated.

Referring to FIG. 3, time interval calculator 20 includes a first comparator 22 having its positive input coupled to the second voltage reference $V_4$ and its negative input coupled to the sinusoidal waveform $V_1$ the peak amplitude $V_2$ of which is to be determined by circuit 10 (FIG. 2). Associated with first comparator 22 is an output pull-up resistor 24 having one side electrically coupled to a positive power supply V+. A second comparator 26 has its positive input electrically coupled to the sinusoidal waveform $V_1$ and its negative input electrically coupled to the first voltage reference $V_3$. Associated with second comparator 26 is another output pull-up resistor 28 also having one side electrically coupled to a positive power supply V+. Comparators 22 and 26 may be any conventional comparators and in fact each may be included in a dual comparator integrated circuit package such as the type identified as LM2903 manufactured by National Semiconductor. Coupled as described hereinabove comparators 22 and 26 form a conventional limiting circuit which selects for transmission that portion of the sinusoidal waveform $V_1$ which lies between the first reference $V_3$ and the second reference $V_4$. Further included in the time interval calculator 20 is an inverting logic gate 30 having inputs a, b, and c and an output 32. In the preferred embodiment, logic gate 30 is a NAND gate. The input a of logic gate 30 is coupled to the output of first comparator 22, the input b is coupled to the output of second comparator 26, and the input c is coupled to a source of equally spaced pulses (clock) having a period t. In response to each of these three inputs logic gate 30 provides at its output 32 a series of electrical pulses the number N of which are counted by a counter 34 to provide an output 38 represented by the expression:

$$N = \Delta T/t$$

Therefore by counting the number N of electrical pulses provided by logic gate 30 the time interval $\Delta T$ between reference $V_3$ and reference $V_4$ can be measured in accordance with the above expression.

Referring to FIG. 4, voltage differentiator 40 includes an operational amplifier 42 of the type manufactured by National Semiconductor and identified as LM2904. The amplifier 42 has its positive input electrically coupled to the second reference $V_4$ through a voltage divider network consisting of resistors 44 and 46. The negative input of amplifier 42 is electrically coupled to the first reference $V_3$ through a resistor 48. The output 52 of amplifier 42 is electrically coupled through a resistor 50 to the negative input of the amplifier 42. Coupled operational amplifier 42 with resistors 44, 46, 48, and 50 in the manner described hereinabove forms a DC summing amplifier whrein the output 52 is represented by the expression:

$$\Delta V = V_4 - V_3.$$

As long as the second reference $V_4$ is greater than or equal to the first reference $V_3$ the output 52 of operational amplifier 42 will be greater than zero. Since the output 52 of the summing amplifier is an analog signal, in order to be able to utilize such signal in a digital system it must be converted to a digital output. This is accomplished by utilizing an analog to digital converter 54 of the type manufactured by National Semiconductor and identified as ADC0800P. Accordingly, the digital output 58 of voltage differentiator 40 is represented by the expression:

$$L = V_4 - V_3$$

wherein L represents a digital signal. It should be noted that if voltage differentiator 40 were to be utilized with a processing unit 80 which is capable of responding to analog signals, the utilization of an analog to digital converter 54 would again be obviated. It should further be noted that if reference voltages $V_3$ and $V_4$ are in fact fixed references the difference therebetween may be known without the necessity of voltage differentiator 40. Accordingly, the voltage differentiator 40 is not considered to be a critical feature of the present invention.

Referring to FIG. 5, frequency determinator 60 includes a comparator 62 of the type manufactured by National Semiconductor and again identified as LM2903 having its positive input coupled to the sinusoidal waveform $V_1$ and its negative input coupled to ground potential. The output of comparator 62 is again electrically coupled to a pull-up resistor 64 having one side coupled to a positive power supply V+. Comparator 62, as illustrated, has been coupled in a conventional manner to form a zero crossing detector for detecting each time that the sinusoidal waveform $V_1$ crosses zero. Frequency differentiator 60 further includes an inverting logic gate 66 having inputs a, b, c, and an output 68. The inverting logic gate in the preferred embodiment, is a three-input NAND gate. Inputs a and b of the logic gate 66 are commonly coupled to the output of comparator 62 and the input c of logic gate 66 is coupled to a source of equally spaced pulses (clock) having a period t. In accordance with the inputs a, b, and c of logic gate 66, the output 68 provides a number M of electrical pulses which are counted by a counter 70 to provide an output 78 represented by the expression:

$$M = 1/2\omega t$$

Counter 70 may be any conventional 12-stage binary ripple counter such as one manufactured by National Semiconductor and identified as CD4060BM. By counting the number M of electrical pulses provided at the output 68 of logic gate 66, the frequency of oscillation $\omega$ of the sinusoidal waveform $V_1$ can be determined and represented by the expression:

$$\omega = 1/2tM$$

Each of the outputs 38, 58, and 78 of time interval calculator 20, voltage differentiator 40, and frequency differentiator 60 respectively are applied to inputs of the processing unit 80 whereby the processing unit determines the peak amplitude $V_2$ of voltage waveform $V_1$ in accordance with the expression:

$$V_2 = \frac{V_4 - V_3}{\omega \Delta T}$$

or where $V_3 = 0$ $$V_2 = V_4/(\omega \Delta T)$$

One important application of the circuit 10 shown in FIG. 2 is in controlling the operation of an induction motor of the type including a main winding and at least one start winding. Typically, to start an induction motor both the main and start winding must be energized until the motor approaches its running speed. When the motor is operating at its running speed the start winding should be deenergized since continuous operation of the start winding may cause the motor to overheat. It will be understood by those skilled in the art that an induction motor may include more than one start winding thereby allowing bidirectional operation by selectively energizing one of the start windings. However, during any start up of the motor only one of the start windings will be energized coincidently with the main winding.

Figure 6:
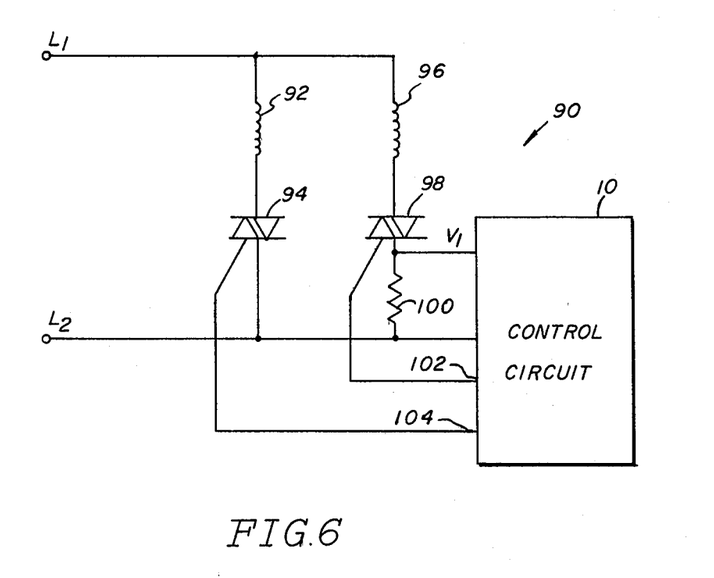
FIG. 6 is a schematic circuit diagram of a motor start control system employing the control circuit shown in FIG. 2.

Illustrated in FIG. 6 is a schematic circuit diagram of a motor start control system 90 which employs the control circuit 10 shown in FIG. 2. A typical induction motor will include at least one start winding 92 which has one side electrically coupled to an AC line at L1 and the other side electrically coupled through a switching device 94 such as a bidirectional semiconductor switching device or triac which is further electrically coupled to the AC line at L2. The induction motor will further include a main winding 96 having one side electrically coupled to the AC line at L1 and the other side electrically coupled through another switching device 98 such as a bidirectional semiconductor switching device or triac which also is coupled to the AC line at L2. As has previously been discussed, it is well known in the art that the main winding current decreases as the motor increases in speed or is stopped. Prior art control systems have utilized this main winding current by coupling in series with the main winding 96 a current sensing device 100 such as a resistor whereby the main winding current is converted to a voltage waveform $V_1$ proportional to the main winding current. Heretofore this voltage waveform $V_1$ has been compared to either a fixed threshold level or a variable threshold level where the threshold level is varied in accordance with external conditions to the motor utilizing auxiliary circuitry. See for example, U.S. Pat. Nos. 3,764,871 and 4,047,082 issued to Scheuer et al on Oct. 9, 1973 and Sept. 6, 1977 respectively. When the main winding current is greater than the threshold level, the start winding 92 is energized through switching device 94 and when the main winding current is less than the threshold level the start winding 92 is deenergized by switching device 94. By utilizing the control circuit 10 previously described and shown in FIG. 2 a dynamic measurement of the change in main winding current can be made and voltage waveforms $V_1$ representing the main winding current during and after starting may be compared. When the voltage waveform $V_1$ representative of main winding current after it has reached running speed is less than a predefined percentage of the voltage waveform $V_1$ of the main winding current before the motor has reached running speed the start winding 92 will be deenergized. In accordance with this approach, production tolerances, temperature variations and line variations are compensated for, since the threshold level utilized to energize and deenergize the start winding 92 is determined and varies in accordance with the main winding current measured before the motor has reached its running speed. Outputs 102 and 104 of control circuit 10 will provide the necessary signals to energize and deenergize start winding 92 and main winding 96 of the motor.

Figure 7:
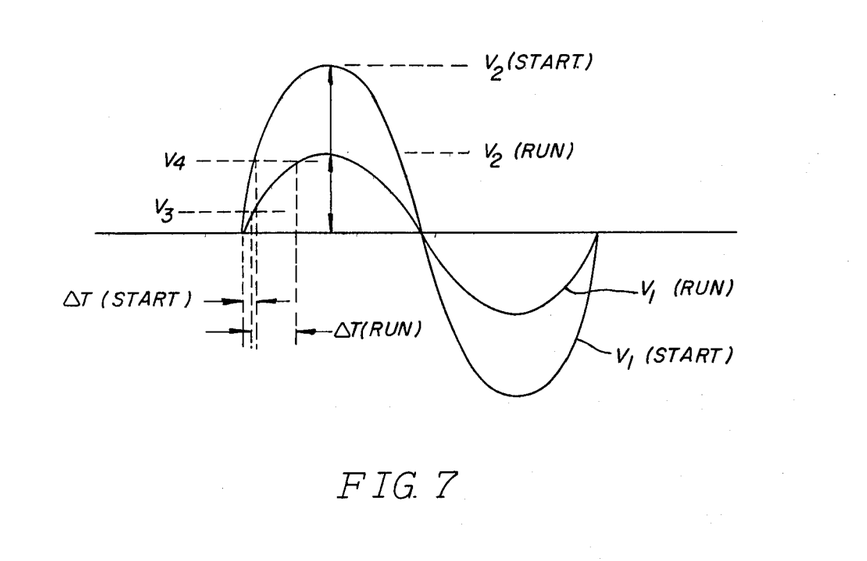
FIG. 7 are sinusoidal waveforms representative of the main winding current of an induction motor both during and after start up.

By referring to FIG. 7 where there is shown a sinusoidal waveform which is proportional to the main winding current before the motor has reached its running speed i.e. $V_1$ (start) and a sinusoidal voltage waveform proportional to the main winding current after the motor has reached its running speed i.e. $V_1$ (run), an analysis of the operation of control system 90 illustrated in FIG. 6 can be described. In accordance with the expressions previously derived for a sinusoidal waveform $V_1$ the peak amplitude $V_2$ thereof is represented by the expression:

$$V_2 = \frac{V_4 - V_3}{\omega \Delta T}$$

It therefore follows that the expressions representative of the peak amplitude $V_2$ (start) of the voltage waveform $V_1$ (start) during start-up and the peak amplitude $V_2$ (run) of the voltage waveform $V_1$ (run) after the motor has reached its running speed will be (where $V_3 = 0$):

$$\Delta T_{run} = tN_{run} = \frac{V_4}{I_{run}} \text{ and } \Delta T_{start} = tN_{start} = \frac{V_4}{I_{start}}$$

Accordingly, $$N_{start}/N_{run} = I_{run}/I_{start}$$

Therefore, comparing the start main winding current to the run main winding current, the start winding 94 is controllable. The start winding 92 is deenergized when the continuously monitored run main winding current is less than a predetermined percentage of the start main winding current. In the preferred embodiment of the present invention, it has been found advantageous to deenergize the start winding 92 when the main winding current is less than 60 percent of the start main winding current. However, it will be understood that control circuit 10 may be programmed to energize and deenergize start winding 92 in accordance with various predefined percentages of start main winding current without departing from the spirit or scope of the present invention.

Figure 8:
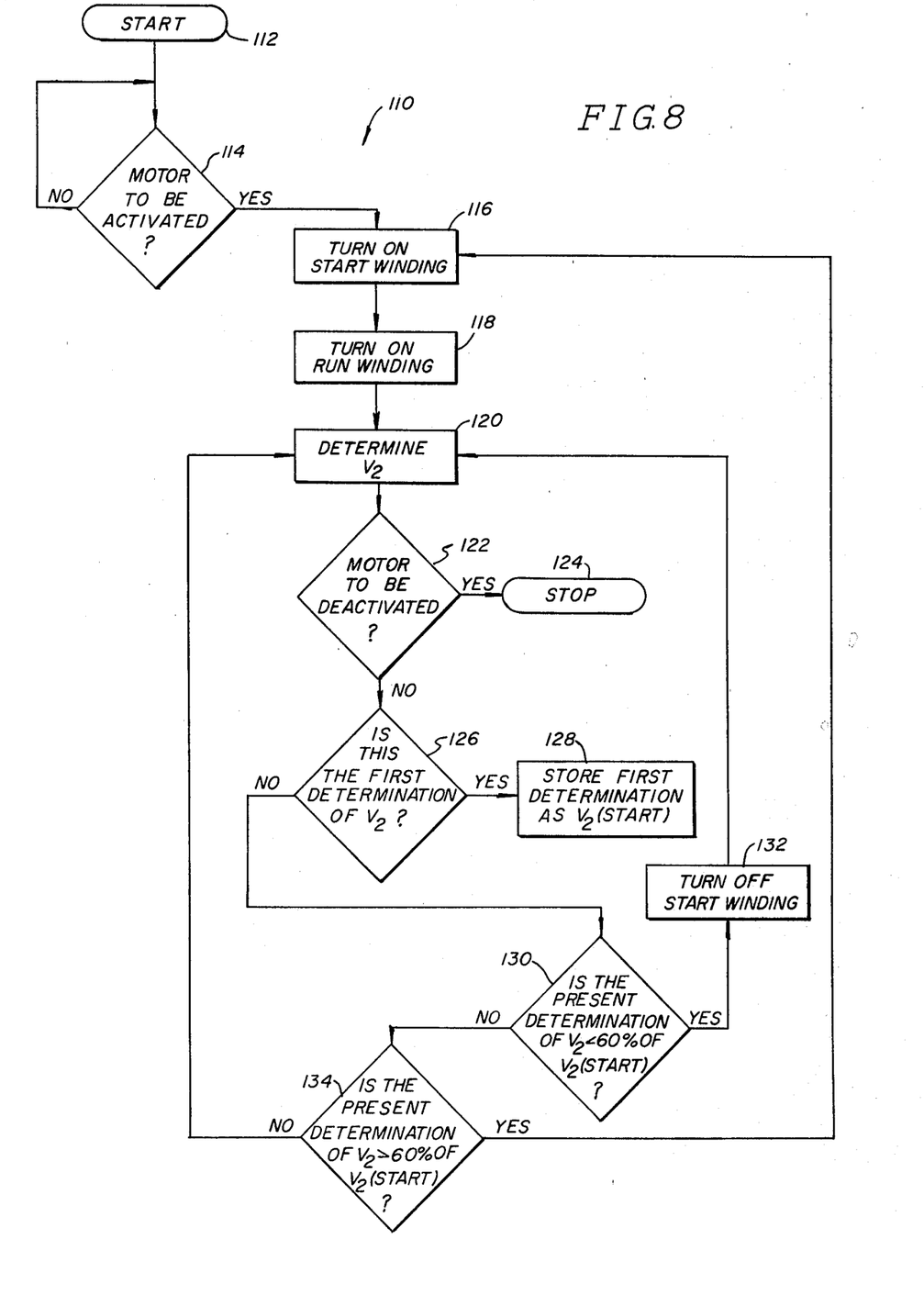
FIG. 8 is a flow diagram charting the functions of the motor start control system as shown in FIG. 6.

A method of controlling the operation of a motor in accordance with the control system shown in FIG. 6 is illustrated in the form of a flow diagram in FIG. 8. While the method 110 illustrated in FIG. 8 may be accomplished utilizing a variety of control systems, it will be understood that by utilizing a microprocessor as the processing unit 80 of control circuit 10 (See FIG. 6) the various steps associated with the method 110 may be programmed into the microprocessor.

Referring to FIG. 8, the initial step of the method 110 is to apply power to the control circuit 10 as indicated by the function, start, 112. Thereafter, the control circuit 10 determines whether the motor is to be activated in step 114. If the motor is to be activated or energized then control circuit 10 through its outputs 102 and 104 (See FIG. 6) will energize the start winding 92 and the main winding 96 sequentially in accordance with the steps 116 and 118 respectively. Utilizing the technique associated with circuit 10 for measuring peak amplitudes of sinusoidal waveforms $V_1$ as heretofore described and illustrated in FIGS. 1, 2, 3, 4, and 5, the next step of the method 110 is to determine peak amplitudes $V_2$ of the sinusoidal waveform proportional to the main winding current of the motor in accordance with the expression:

$$V_2 = \frac{V_4 - V_3}{\omega \Delta T}$$

This function is accomplished in step 120. Thereafter, the control circuit 10 will determine whether or not the motor is to be deenergized in accordance with step 122. If the motor is to be deenergized then the control circuit 10 will deenergize the start winding 29 and the main winding 96 thereby terminating operation of the control system 90 in accordance with step 124. If the motor is not to be deenergized at this point in time, then control circuit 10 determines whether the present determination of the peak amplitude $V_2$ of the waveform $V_1$ is the first determination. This is accomplished in accordance with step 126 for the purpose of establishing that the peak amplitude $V_2$ is in fact the peak amplitude $V_2$ (start) associated with the waveform during the starting of the motor and not during the normal running of the motor. If the present peak amplitude $V_2$ is the first determination, then this initial peak amplitude $V_2$ (start) of the waveform is stored as the peak amplitude of the start main winding current in accordance with step 128. However, if the determination of the peak amplitude $V_2$ is not the initial peak amplitude associated with the start main winding current then in accordance with step 130 control circuit 10 determines whether or not the present determination of peak amplitude $V_2$ is less than 60 percent of the stored initial peak amplitude $V_2$ (start). When the peak amplitude $V_2$ (run) is less than 60 percent of $V_2$ (start) this is considered by control circuit 10 to be an indication that the motor is now operating at its normal running speed and in accordance with step 132 control circuit 10 initiates a pulse at its output 104 deenergizing start winding 92.

As further illustrated in FIG. 8, even though the start winding 92 has been deenergized, the control circuit 10 continues to determine peak amplitudes $V_2$ and to assure that the present determination of $V_2$ is less than 60 percent of $V_2$ (start). If the continuously monitored peak amplitudes $V_2$ are not less than 60 percent of $V_2$ (start) then in accordance with step 134 the control circuit 10 determines if the present peak amplitude $V_2$ is greater than 60 percent of $V_2$ (start). If $V_2$ is greater than 60 percent of $V_2$ (start) this is an indication that the motor speed has not reached the normal running speed or that the motor has stopped completely. Accordingly, when $V_2$ is greater than 60 percent of $V_2$ (start) the control circuit 10 reenergizes the start winding 92 to increase the operating speed of the motor. Even if $V_2$ is not greater than 60 percent of $V_2$ (start), control circuit 10 continues to determine peak amplitudes $V_2$ of the waveform $V_1$ and continues to compare such peak amplitudes $V_2$ to the stored $V_2$ (start).

The method 110 charted in FIG. 8 clearly illustrates how the control system 90 (FIG. 6) is capable of accommodating conditions external to the motor which influence its operation by continuously monitoring the peak amplitude $V_2$ of a waveform $V_1$ which is proportional to the main winding current. Since the peak amplitude $V_2$ associated with the start main winding current is stored within the control circuit 10 for each operating period of the motor, a change in conditions associated with the motor are taken into consideration during each period of operation without the need for auxiliary circuits. Furthermore, as previously indicated, the control system 90 may be utilized to monitor various other conditions associated with the operation of the motor wherein such conditions affect the peak amplitude $V_2$ of the waveform $V_1$. Such conditions may be excessive motor current due to a variety of external problems or a complete internal failure of the motor.

What is claimed is:

1. In a motor start control system of the type having a current sensing device for producing a signal proportional to the main winding current of said motor and a control circuit responsive to said signal for deenergizing the start winding of said motor when the peak amplitude of said signal is less than a threshold level, the improvement wherein said control circuit includes means for storing said threshhold level as a proportion of the initial peak amplitude of said main winding current.

2. The improvement as recited in claim 1 wherein said threshold level is equivalent to 60 percent of said initial peak amplitude of said main winding current.

3. A method of controlling the operation of a motor of the type having a main winding and at least one start winding comprising the steps of: energizing said start winding and main winding, continuously determining peak amplitudes of a waveform proportional to main winding current, storing an initial peak amplitude of said waveform, and deenergizing said start winding when a peak amplitude of said waveform is less than a defined percentage of said stored peak amplitude.

4. The method as recited in claim 3 further including the steps of continuously monitoring said main winding current and converting said current to a sinusoidal voltage waveform.

5. The method as recited in claim 3 wherein said peak amplitudes of said waveform are determined in accordance with an expression representing said waveform by differentiating between a first and second reference selected within an interval of said waveform wherein the rate of change of the amplitude of said waveform is substantially constant, measuring a time interval between said references, and determining the frequency of oscillation of said waveform.

6. The method as recited in claim 5 wherein said peak amplitudes of said waveform are determined in accordance with the expression:

$$P = \frac{Ref_2 - Ref_1}{\omega \Delta T}$$

wherein:
P = peak amplitude
$Ref_1$ = first reference
$Ref_2$ = second reference
$\omega$ = frequency of oscillation of said waveform
$\Delta T$ = time interval between said references.

7. The method as recited in claim 6 further including the step of establishing said initial peak amplitude of said waveform while start winding is energized.

8. The method as recited in claim 7 further including the step of comparing each determined peak amplitude of said waveform to said stored peak amplitude and deenergizing said start winding when said peak amplitude is less than 60 percent of said stored peak amplitude.

9. The method as recited in claim 8 further including the step of reenergizing said start winding when said peak amplitude is greater than 60 percent of said stored peak amplitude.

10. The control system of claim 1, wherein said control circuit includes means for measuring the peak amplitudes of said main winding current including means for differentiating between a first and second reference selected within an interval of the waveform of said main winding current wherein the rate of change of the amplitude of said waveform is substantially constant, means for measuring a time interval between said references, means for determining the frequency of oscillation of said waveform, and a processing unit means responsive to said means for differentiating between said references, said means for measuring said time interval, and said means for determining the frequency of oscillation for calculating a peak amplitude of said waveform.

11. The circuit as recited in claim 10 wherein said peak amplitude of said waveform is calculated by said processing unit means in accordance with the expression:

$$P = \frac{Ref_2 - Ref_1}{\omega \Delta T}$$

wherein:
P = peak amplitude
$Ref_1$ = first reference
$Ref_2$ = second reference
$\omega$ = frequency of oscillation of said waveform
$\Delta T$ = time interval between said references.

12. The circuit as recited in claim 10 wherein said first reference is located at a zero crossing of said waveform and therefore is substantially equal to zero.

* * * * *